(12) United States Patent
Brownlow et al.

(10) Patent No.: US 8,862,739 B2
(45) Date of Patent: Oct. 14, 2014

(54) ALLOCATING RESOURCES TO VIRTUAL FUNCTIONS

(75) Inventors: Sean T. Brownlow, Rochester, MN (US); John R. Oberly, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 13/004,558

(22) Filed: Jan. 11, 2011

(65) Prior Publication Data

US 2012/0180048 A1  Jul. 12, 2012

(51) Int. Cl.
G06F 15/173 (2006.01)
G06F 9/50 (2006.01)

(52) U.S. Cl.
CPC .................. *G06F 9/5077* (2013.01)
USPC .............. 709/226; 709/250; 718/104; 710/38

(58) Field of Classification Search
CPC ................................................ G06Q 10/06393
USPC ...................... 709/250, 226; 718/104; 710/38
See application file for complete search history.

(56) References Cited

U.S. PATENT DOCUMENTS

| | | | |
|---|---|---|---|
| 5,892,941 A * | 4/1999 | Khan et al. ....................... 703/22 |
| 7,706,303 B2 * | 4/2010 | Bose et al. ..................... 370/254 |
| 8,103,810 B2 * | 1/2012 | Brown et al. ..................... 710/62 |
| 2004/0143664 A1 * | 7/2004 | Usa et al. ....................... 709/226 |
| 2009/0037941 A1 * | 2/2009 | Armstrong et al. ............ 719/328 |
| 2009/0118839 A1 * | 5/2009 | Accapadi et al. ................. 700/28 |
| 2009/0198766 A1 * | 8/2009 | Chen et al. ..................... 709/202 |
| 2009/0248937 A1 | 10/2009 | Solomon et al. |
| 2009/0276773 A1 | 11/2009 | Brown et al. |
| 2009/0313391 A1 | 12/2009 | Watanabe |
| 2010/0014526 A1 | 1/2010 | Chavan et al. |
| 2010/0082874 A1 | 4/2010 | Baba et al. |
| 2010/0095310 A1 | 4/2010 | Oshins |
| 2010/0180274 A1 | 7/2010 | Cherian et al. |

OTHER PUBLICATIONS

Himanshu Raj, Karsten Schwan (2007) High Performance and Scalable I/O Virtualization via Self-Virtualized Devices, in Proceedings of HPDC 2007, longer version available as CERCS tech report GIT-CERCS-06-02.*

* cited by examiner

*Primary Examiner* — David Lazaro
*Assistant Examiner* — Marie Georges Henry
(74) *Attorney, Agent, or Firm* — Toler Law Group (57) ABSTRACT

A method of assigning resources to an input/output adapter having multiple ports may include determining a first port of the input/output adapter that includes a first bandwidth availability. A first number of resources assigned to the first port may be modified. The method may further include comparing a total count of resources assigned the ports to a maximum number of resources, where the total count includes the modified first number of resources. At least a portion of the modified first number of resources to the first port may be allocated to the first port.

19 Claims, 7 Drawing Sheets

ALLOCATING RESOURCES TO VIRTUAL FUNCTIONS

I. FIELD OF THE DISCLOSURE

The present disclosure relates generally to computer systems, and more particularly, to virtualized functions that are hosted by a virtualized input/output (I/O) adapter.

II. BACKGROUND

A logically-partitioned computer system may use a virtualized hardware input/output (I/O) adapter to provide virtual functions to multiple logical partitions. An application executing in a logical partition may request a virtual function. Internal resources at the virtualized hardware I/O adapter may be allocated in response, and the requested virtual function may be configured to use the allocated resources. Resource allocation and virtual function configuration may affect processing speeds.

SUMMARY

In a particular embodiment, a method of assigning resources to an input/output adapter having a plurality of ports may include determining a first port of the plurality of ports of the input/output adapter that includes a first bandwidth availability. A first number of resources assigned to the first port may be modified. The method may further include comparing a total count of resources assigned the plurality of ports to a maximum number of resources. The total count may include the modified first number of resources. At least a portion of the modified first number of resources to the first port may be allocated to the first port.

In another particular embodiment, an apparatus may include an input/output adapter including a plurality of ports and a memory storing program code. A processor may be configured to access the memory and to execute the program code to initiate determining a first port of the plurality of ports that includes a least number of virtual functions. The processor may further execute the program code to initiate modifying a first number of resources assigned to the first port and to initiate comparing a total count of resources assigned the plurality of ports to a maximum number of resources. The total count may include the modified first number of resources. The processor may further be configured to execute the program code to initiate allocating at least a portion of the modified first number of resources to the first port.

In another particular embodiment, a program product may include program code configured to be executed by a processor to initiate determining a first port of the plurality of ports of an input/output adapter that includes a first bandwidth availability. The processor may further execute the program code to initiate modifying a first number of resources assigned to the first port and to initiate comparing a total count of resources assigned the plurality of ports to a maximum number of resources. The total count may include the modified first number of resources. The processor may further be configured to execute the program code to initiate allocating at least a portion of the modified first number of resources to the first port. The program product may further include a tangible computer readable medium bearing the program code.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

IV. DETAILED DESCRIPTION

In a virtualized computer system, a hardware input/output (I/O) adapter may be capable of providing virtual functions to multiple logical partitions. When a logical partition requests a virtual function during runtime, internal resources of the hardware I/O adapter may be allocated to the virtual function. The internal resources may include platform hardware interrupt sources, ingress queues, egress queues, operating modes (e.g., promiscuous mode and diagnostic mode), and/or other resources. The virtual function may be configured to use the allocated resources of the hardware I/O adapter. A high number of available resources may facilitate increased parallelism and, consequently, increased processing speed.

The resources may be fairly distributed to the virtual functions of the hardware I/O adapter. Moreover, a non-zero amount of the resources may be allocated to each virtual function on each port of the hardware I/O adapter. For example, each virtual function should have at least one interrupt source. A pool of the interrupt sources may be available for distribution to the virtual functions. The fair and consistent distribution of the interrupt sources is useful when there are relatively few interrupt sources. According to a particular embodiment, virtual functions that are likely to have a larger bandwidth and a higher quality of service may have more resources. As such, an embodiment may determine which virtual functions are likely to have at least one of a larger bandwidth or a higher quality of service.

Ports may have a fixed bandwidth. A virtual function on a port with relatively few virtual functions may have more bandwidth than a virtual function on a port with relatively many virtual functions. All virtual functions on a port may be treated equally with regard to distribution. Dividing a limited number of atomic (i.e., non-fractional) resources equally among ports of the hardware I/O adapter may result in a smaller number of resources per port than virtual functions that are configured under a port.

An available bandwidth and a degree of transmit/receive parallelism for a virtual function on a given adapter port may be generally inversely proportional to a maximum number of configured, in-use virtual functions on the port. A larger number of virtual functions on a port may thus use less resources (e.g., interrupt sources and transmit/receive queues, among others) per virtual function. Conversely, a smaller number of virtual functions on a port may use more resources per virtual function to transmit and receive because that port may use a larger segment of bandwidth. The port may further operate with a large degree of parallelism because of the larger average bandwidth available per virtual function.

A particular embodiment of a method may include an iterative approach that distributes resources across all virtual functions of a number of ports. Distribution may favor virtual functions on ports with less total virtual functions, but may maximize a number of available interrupt sources for all virtual functions on the hardware I/O adapter. A method may provide more resources to virtual functions with larger bandwidth capabilities that may benefit from more resources, while scaling evenly across all ports in order to maximize resource utilization.

Figure 1:
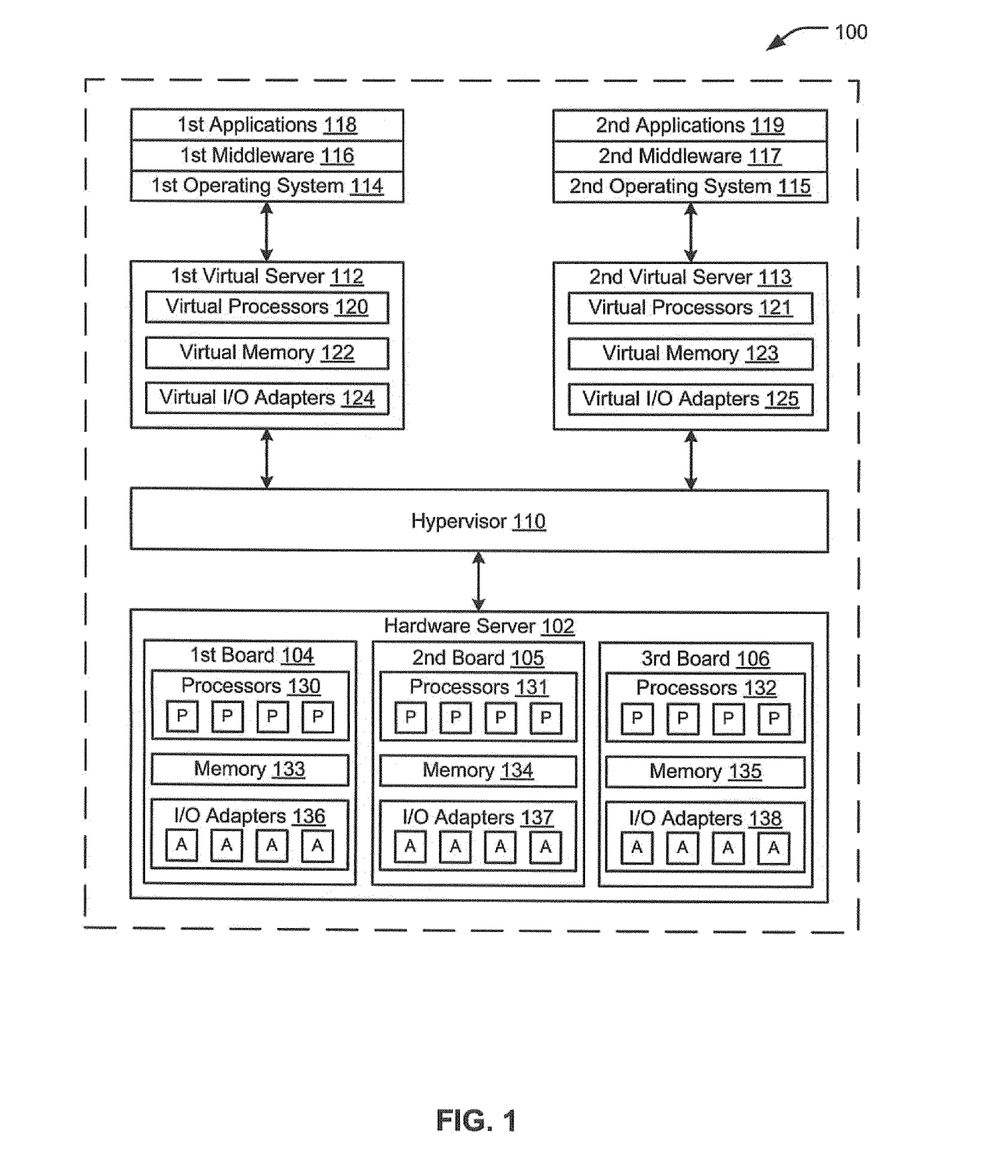
FIG. 1 is a block diagram of a first embodiment of a system to facilitate assigning resources to an input/output hardware adapter.

Referring to FIG. 1, a block diagram of a first embodiment of an environment for assigning resources to one or more I/O hardware adapters is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and I/O adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions, such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the hardware of the hardware server 102 to the virtual servers 112, 113. For example, the processors 130-132 may be mapped to the virtual processors 120, 121. The memory 133-135 may be mapped to the virtual memory 122, 123, and the I/O adapters 136-138 may be mapped to the virtual I/O adapters 124-125. The hypervisor 110 may manage the selection of portions of the hardware server 102 and their temporary assignment to portions of the virtual servers 112, 113.

The hypervisor 110 may configure virtual functions, such as the virtual I/O adapters 124, 125 during a time period that is prior to runtime (e.g., during a boot time period or during a firmware standby time period). Resources may be assigned to the virtual I/O adapters 124-125. During the runtime, the hypervisor 110 may assign the pre-configured virtual functions to the operating systems 114, 115 to enable applications and middleware that are executing in the operating systems 114, 115 to perform I/O operations.

Figure 2:
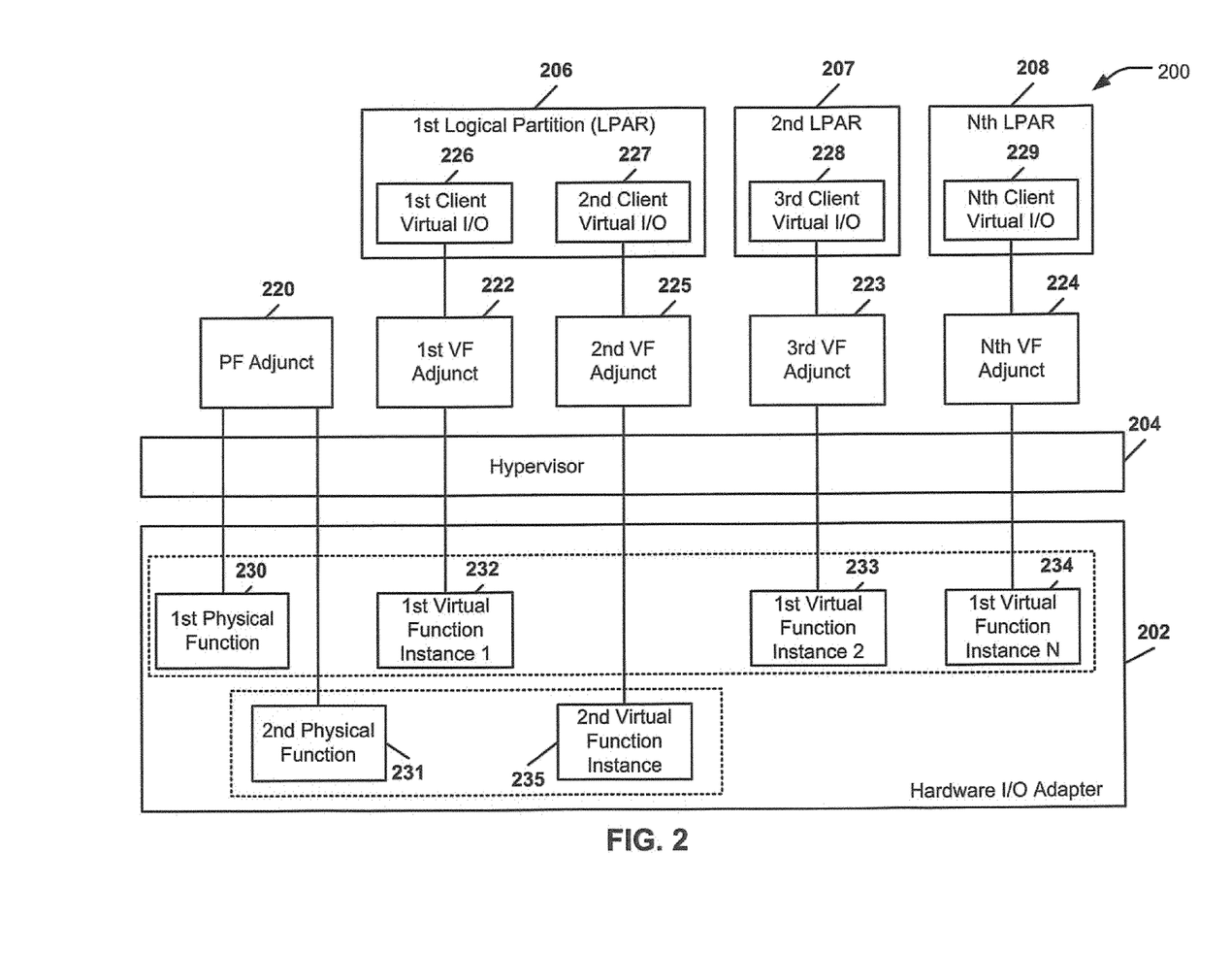
FIG. 2 is a block diagram of a second embodiment of a system to facilitate assigning resources to an input/output hardware adapter.

Referring to FIG. 2, a block diagram of a second embodiment of a system to facilitate assigning resources to an input/output hardware adapter is depicted and generally designated 200. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The physical functions 230, 231 may include peripheral component interconnect (PCI) functions that support single root I/O virtualization capabilities (SR-IOV). Each of the virtual functions 232-235 may be associated with one of the physical functions 230, 231 and may share one or more physical resources of the hardware I/O adapter 202.

Software modules, such as a physical function (PF) adjunct 220 and virtual function (VF) adjuncts 222-225, may assist the hypervisor in managing the physical functions 230, 231 and the virtual functions 232-235. For example, a user may specify a particular configuration and the PF manager 220 may configure the virtual functions 232-235 from the physical functions 230, 231 accordingly. The VF adjuncts 222-225 may function as virtual device drivers. For example, just as a device driver for a physical device may enable a client application to access the functions of the device, each of the VF adjuncts 222-225 may enable a client application to access the virtual functions 232-235. In the system 200, the VF adjuncts 222 and 224-225 may enable access to the first virtual function instances 232 and 234-235, and the second VF adjunct 225 may enable access to the second virtual function 235.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232 via the first VF adjunct 222. The second client virtual I/O 227 may access the second virtual function 235 via the second VF adjunct 225. A third client virtual I/O 228 executing at the second logical partition 207 may access the second instance of the first virtual function 233 via the third VF adjunct 223. An Nth client virtual I/O 229 executing at the Nth logical partition 208 may access the Nth instance of the first virtual function 233 via the Nth VF adjunct 224.

The hypervisor 204 may enable the client virtual I/Os 226-229 to access the virtual functions 232-235 that are associated with the physical functions 230, 231 of the hardware I/O adapter 202. The virtual functions 232-235 of the hardware I/O adapter 202 may be configured prior to a runtime and dynamically assigned during runtime, as described below. For example, the hypervisor 204 may configure virtual functions 232-235 during a time period that is prior to runtime (e.g., during a boot time period or during a firmware standby time period). During the runtime, the hypervisor 204 may assign the pre-configured virtual functions 232-235 to the logical partitions 206-208 to enable client applications that are executing in the logical partitions 206-208 to perform I/O operations.

It will be appreciated by one skilled in the art that the present invention is equally suited to embodiments that do not utilize a virtual function (VF) manager and client virtual I/O to enable a logical partition to access a virtual function, and instead enable a device driver within a logical partition to directly manage the virtual function.

Figure 3:
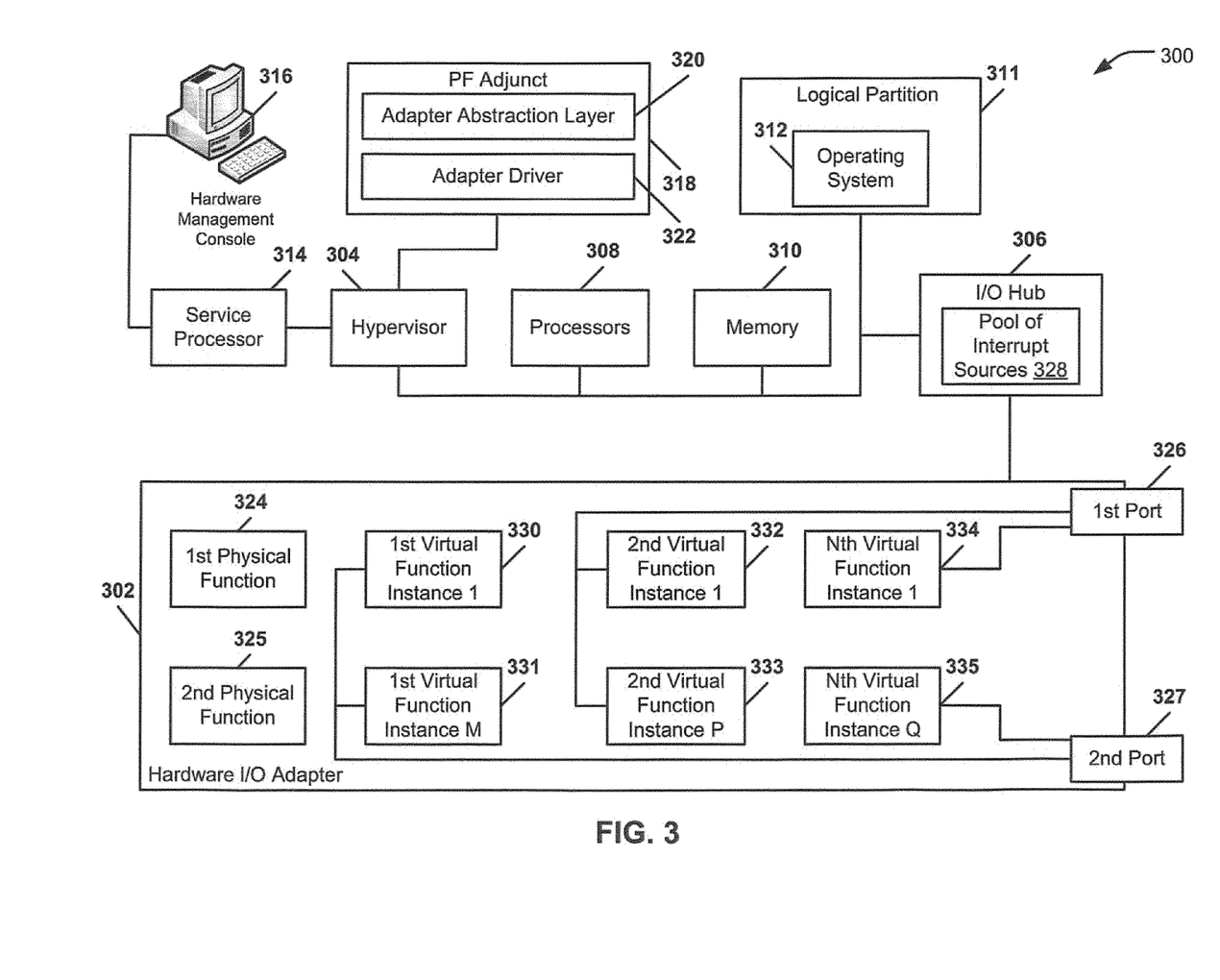
FIG. 3 is a block diagram of a third embodiment of a system to facilitate assigning resources to an input/output hardware adapter.

Referring to FIG. 3, a block diagram of a third embodiment of a system to facilitate assigning resources to an input/output hardware adapter is depicted and generally designated 300. In the system 300, a hypervisor 304 may be coupled to hardware devices, such as a hardware I/O adapter 302, an I/O hub 306, processors 308, and a memory 310. The hypervisor 304 may be coupled to a logical partition 311 that executes an operating system 312. The hypervisor 304 may enable the logical partition 311 to access virtual functions associated with the hardware I/O adapter 302. A physical function (PF) manager 318 may be coupled to the hypervisor 304 to manage the physical functions of the hardware I/O adapter 302. In a particular embodiment, the PF manager 318 may be in a logical partition. A hardware management console 316 may be coupled to the hypervisor 304 via a service processor 314.

The service processor 314 may be a microcontroller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the hardware management console 316.

The hypervisor 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the hypervisor 304. The I/O hub 306 may enable the hypervisor to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The hypervisor 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF manager 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

The hypervisor 304 may thus enable access to the virtual functions 330-335 that are associated with the physical functions 324, 325 of the hardware I/O adapter 302. The virtual functions 330-335 of the hardware I/O adapter 302 may be configured prior to a runtime and dynamically assigned during runtime, as described below. For example, the hypervisor 304 may configure the virtual functions 330-335 during a time period that is prior to runtime (e.g., during a boot time period or during a firmware standby time period). During the runtime, the hypervisor 304 may assign the pre-configured virtual functions 330-335 to a logical partition (e.g., the local partition 311) to enable client applications that are executing in the logical partition to perform I/O operations.

Figure 4:
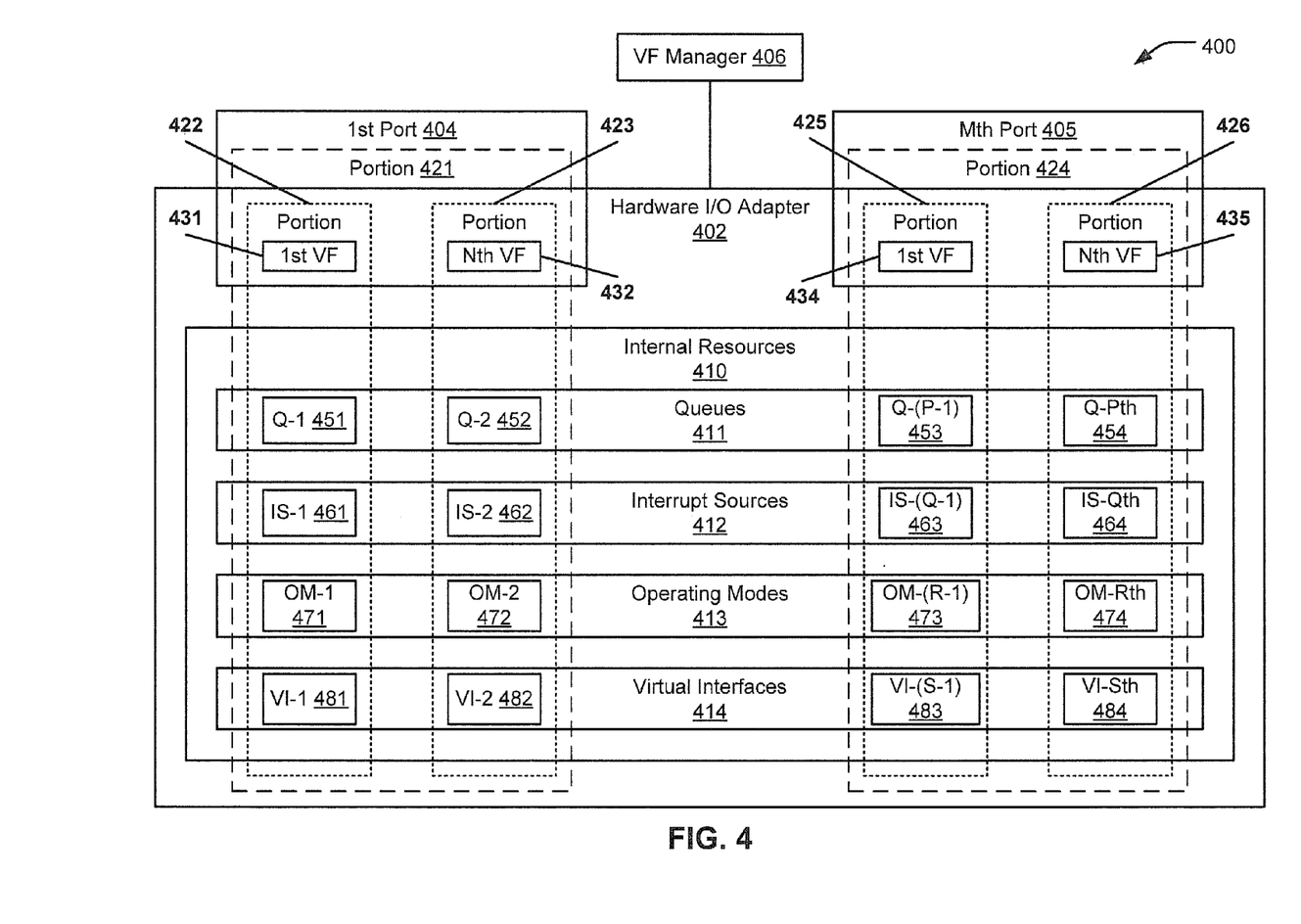
FIG. 4 is a block diagram of a fourth embodiment of a system to facilitate assigning resources to virtual functions of an input/output hardware adapter.

Referring to FIG. 4, a block diagram of a fourth embodiment of a system to facilitate assigning resources to an input/output hardware adapter is depicted and generally designated 400. The system 400 includes a hardware input/output (I/O) adapter 402 managed by an adapter manager 406.

The adapter manager 406 may be a hypervisor (e.g., one of the hypervisor 110 of FIG. 1, the hypervisor 204 of FIG. 2, and the hypervisor 304 of FIG. 3), an adjunct to the hypervisor (e.g., one of the PF adjunct 220 of FIG. 2, the VF adjuncts 222-224 of FIG. 2, and the PF adjunct 318 of FIG. 3), or a combination of both. The adapter manager 406 may configure virtual functions that are hosted by the hardware I/O adapter 402.

The hardware I/O adapter 402 may include various resources, such as queues and operating modes. For example, in FIG. 4, the hardware I/O adapter 402 includes M ports (e.g., where M is greater than 1), such as a first port 404 and an Mth port 405, and internal resources 410. The ports 404 and 405 may be physical ports that are capable of performing I/O operations with external devices.

The internal resources 410 may include one or more queues 411, one or more interrupt sources 412, one or more operating modes 413, one or more other resources 414, or any combination thereof. The queues 411 may include different types of queues, such as ingress queues and egress queues. The queues 411 may include P queues (e.g., where P is greater than 1), such as a first queue 451, a second queue 452, a P-1 queue 453, and a Pth queue 454. The interrupt sources 412 may include Q interrupts sources (e.g., where Q is greater than 1), such as a first interrupt source 461, a second interrupt source 462, a Q-1 interrupt source 463, and a Qth interrupt source 464. The operating modes 416 may include a promiscuous mode, a diagnostic mode, another type of operating mode, or any combination thereof. The operating mode 413 may include R operating modes (e.g., where R is greater than 1), such as a first operating mode 471, a second operating mode 472, an R-1 operating mode 473, and an Rth operating mode 474. The other resources 414 may include S other resources (e.g., where S is greater than 1), such as a first other resource 481, a second other resource 482, an S-1 other resources 483, and an Sth other resource 484.

In operation, prior to a run time, the adapter manager 406 may determine a number of internal resources 410 associated with the hardware I/O adapter 402. For example, prior to a run time, the adapter manager 406 may determine a maximum number of internal resources 410 that are associated with the hardware I/O adapter 402. The adapter manager 406 may determine a number of ports (e.g., the M number of ports 404 and 405) of the hardware I/O adapter 402. The adapter manager 406 may divide the internal resources 410 among the ports of the hardware I/O adapter 402.

The adapter manager 406 may assign a portion 421 of the internal resources 410 for virtual functions that are capable of utilizing the first port 404. The adapter manager 406 may allocate an Mth portion 424 of the internal resources 410 and assign the Mth portion 424 to virtual functions that are capable of utilizing the Mth port 405. The adapter manager 406 may further subdivide the portions 421 and 424 of the internal resources 410 that are assigned to each of the ports 404-405 for each virtual function that is capable of utilizing a particular port. For example, the adapter manager 406 may assign a portion 422 of the portion 421 to a first virtual function 431. The portion 422 may be a subset of the portion 421 of the internal resources 410. The adapter manager 406 may assign a portion 423 of the portion 421 to an Nth virtual function 432. The portion 423 may be a subset of the portion 421 of the internal resources 410.

The adapter manager 406 may assign subdivide the portion 424 among virtual functions that are capable of utilizing the Mth port 405. For example, the adapter manager 406 may assign a portion 425 of the portion 424 that is assigned to the Mth port 405 to a first virtual function 434. The adapter manager 406 may allocate a portion 426 and assign the sixth portion 426 to an Nth virtual function 435. In FIG. 4, the ports 404-405 are depicted as having an equal number of virtual functions associated with each of the ports 404-405. In a particular embodiment, each port of the hardware I/O adapter 402 may have a different number of virtual functions associated with each port of the hardware I/O adapter 402.

The adapter manager 406 may configure the virtual functions 431-435 to perform I/O operations using the portions of the internal resources 410 that are assigned to each of the virtual functions 431-435. For example, the adapter manager 406 may configure the first virtual function 431 of the first port 404 using the portion 422 of the internal resources 410. The adapter manager 406 may configure the Nth virtual function 432 of the first port 404 using the portion 423 of the internal resources 410. The adapter manager 406 may configure the first virtual function 434 of the Mth port 405 using the portion 425 of the internal resources 410. The adapter manager 406 may configure the Nth virtual function 435 of the second port 405 using the portion 426 of the internal resources 410.

An adapter manager 406 may assign the portions 421, 424 of the internal resources 410 to the ports 404 and 405, respectively. The adapter manager 406 may subdivide the portion 421 among the virtual functions 431 and 432 that are capable of utilizing the port 404. The adapter manager 406 may subdivide the portion 424 among the virtual functions 434 and 435 that are capable of utilizing the port 405. The adapter manager 406 may thus allocate the internal resources 410 and configure a number of virtual functions that the hardware I/O adapter 402 is capable of supporting. Where the virtual functions 431-435 are configured prior to the runtime, the adapter manager 406 may enable rapid and dynamic assignment of the virtual functions during the runtime. A runtime delay resulting from assigning a pre-configured virtual function to a logical partition may be reduced as compared to allocating internal resources and configuring a virtual function during the runtime.

Figure 5:
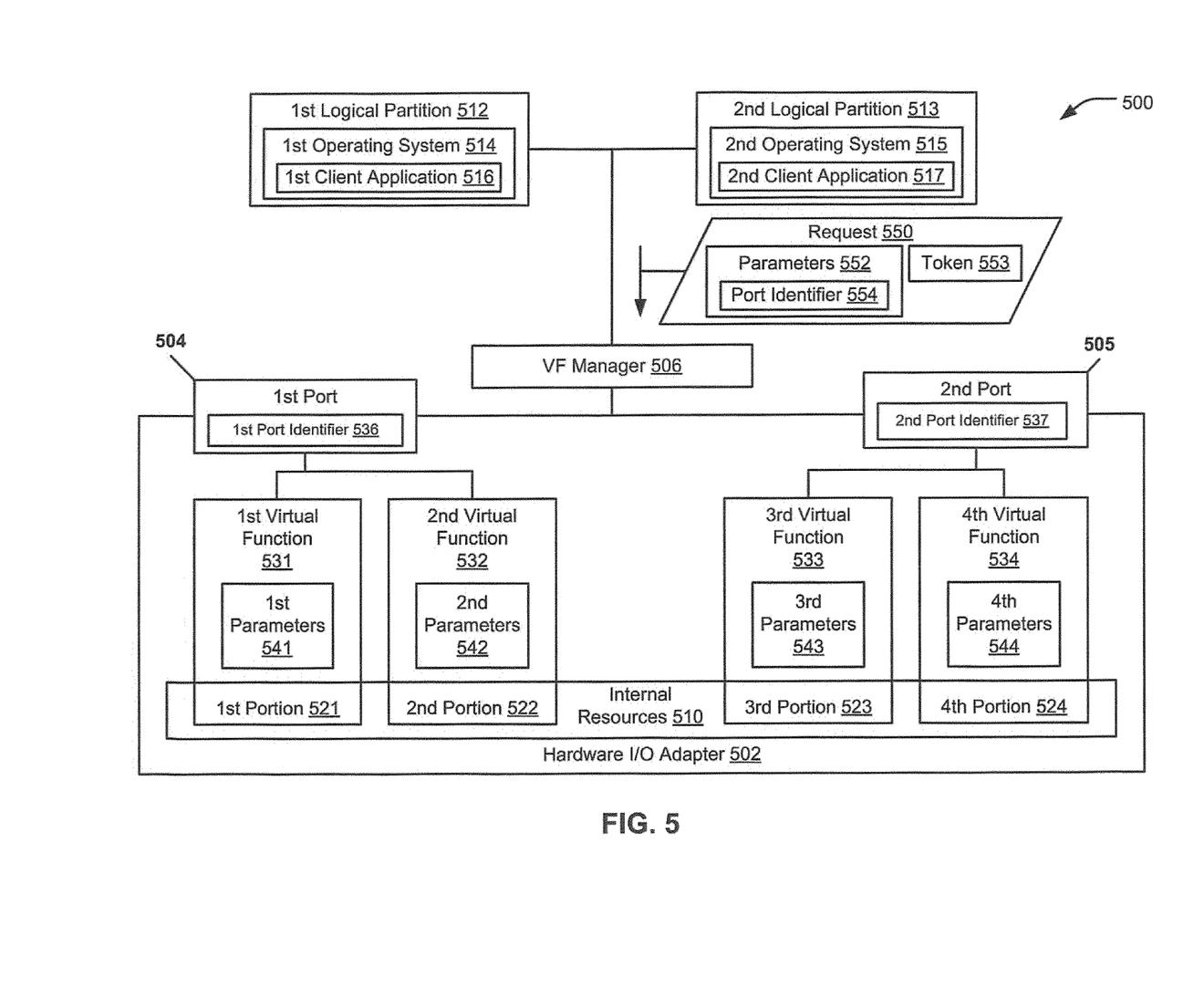
FIG. 5 is a block diagram of a fifth embodiment of a system to facilitate assigning resources to virtual functions of an input/output hardware adapter.

Referring to FIG. 5, a block diagram of a fifth embodiment of a system to facilitate assigning resources to an input/output hardware adapter is depicted and generally designated 500. In the system 500, a virtual function (VF) manager 506 may respond to a request from a logical partition, such as one of logical partitions 512 and 513, to provide a virtual function that is hosted by a hardware input/output (I/O) adapter 502. The VF manager 506 may be a hypervisor (e.g., one of the hypervisor 110 of FIG. 1, the hypervisor 204 of FIG. 2, and the hypervisor 304 of FIG. 3).

An operating system and one or more client applications may execute in each of the logical partitions 512 and 513. For example, in FIG. 5, the first logical partition 512 may execute a first operating system 514 and a first client application 516. The second logical partition 513 may execute a second operating system 515 and a second client application 517.

The hardware I/O adapter 502 may be a virtual I/O adapter that is capable of providing virtual functions, such as a single root I/O virtualization adapter (SR-IOV). The hardware I/O adapter 502 may include internal resources 510, such as egress queues, ingress queues, interrupt sources, operating modes, other internal resources associated with the hardware I/O adapter 502, or any combination thereof. The hardware I/O adapter 502 may include a particular number of ports, such as a first port 504 and a second port 505. Each of the ports 504 and 505 may have a unique identifier. For example, the first port 504 may have a first port identifier 536. The second port 505 may have a second port identifier 537.

The hardware I/O adapter 502 may be capable of hosting multiple virtual functions, such as a first virtual function 531, a second virtual function 532, a third virtual function 533 and a fourth virtual function 534. One or more parameters may be associated with each of the virtual functions 531-534. For example, first parameters 541 may be associated with first virtual function 531, second parameters 542 may be associated with the second virtual function 532, third parameters 543 may be associated with the third virtual function 533, and fourth parameters 544 may be associated with the fourth virtual function 534. The parameters 541-544 may include one or more parameters associated with a virtual function, such as which of the ports 504 and 505 a particular virtual function is capable of accessing. In FIG. 5, the virtual functions 531-532 may be capable of accessing the first port 504 and the virtual functions 533-534 may be capable of accessing the second port 505.

The VF manager 506 may divide and allocate the internal resources 510 among the virtual functions 531-534 that the hardware I/O adapter 502 is capable of hosting. For example, the VF manager 506 may subdivide a first portion 521 of the internal resources 510 to the first virtual function 531. The VF manager 506 may allocate a second portion 522 of the internal resources 510 to the second virtual function 532. The VF manager 506 may allocate a third portion 523 of the internal resources 510 to the third virtual function 533. The VF manager 506 may allocate a fourth portion 524 of the internal resources 510 to the fourth virtual function 534.

The VF manager 506 may configure each of the virtual functions that the hardware I/O adapter 502 is capable of hosting. For example, the VF manager 506 may configure the first virtual function 531 to use the first portion 521 of the internal resources 510. The VF manager 506 may configure the second virtual function 532 to use the second portion 522 of the internal resources 510. The VF manager 506 may configure the third virtual function 533 to use the third portion 523 of the internal resources 510. The VF manager 506 may configure the fourth virtual function 534 to use the fourth portion 524 of the internal resources 510. The VF manager 506 may thus configure the virtual functions 531-534 that the hardware I/O adapter 502 is capable of hosting.

Figure 6:
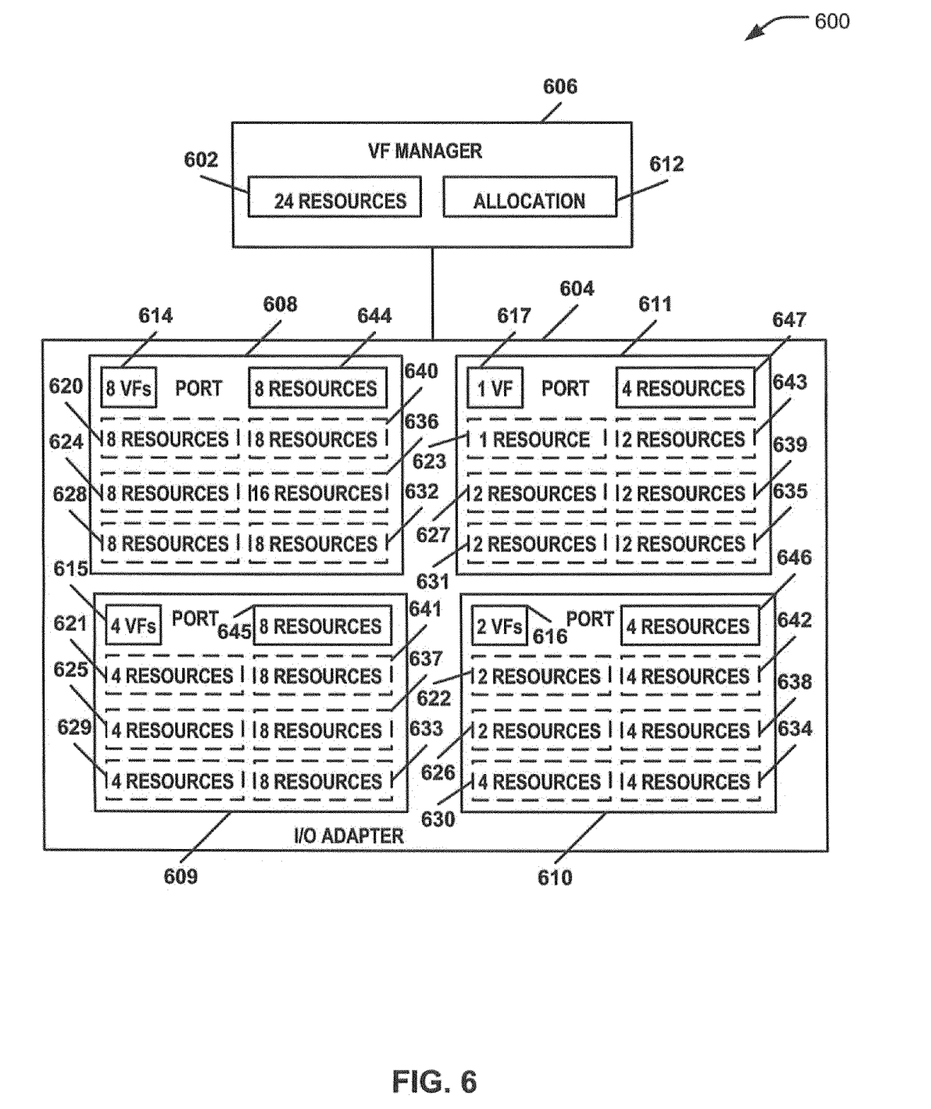
FIG. 6 is a block diagram of a sixth embodiment of a system to facilitate assigning resources to virtual functions of an input/output hardware adapter.

FIG. 6 is a block diagram of a system 600 having resources 602 available to be iteratively assigned to an I/O adapter 604. Illustrative resources 602 may include interrupt sources, ingress queues, egress queues, operating modes (e.g., promiscuous mode and diagnostic mode), and/or other computing resources. The I/O adapter 604 may be coupled to a virtual function (VF) manager 606 and may include multiple ports 608-611. In the embodiment of FIG. 6, the virtual function manager 606 may include twenty-four available resources 602 that are allowed to be assigned and ultimately allocated to the ports 608-611 of the I/O adapter 604. More particularly, the virtual function manager 606 may use allocation program code 612 to assign the available resources 602 to virtual functions 614-617 of the ports 608-611.

The assignment and allocation of the available resources 602 may be based on a bandwidth availability of the ports 608-611. Resources may be iteratively distributed across all virtual functions 614-617 of the ports 608-611. Distribution may favor virtual functions 614-617 on ports 608-611 with less total virtual functions, but may maximize a number of available interrupt sources 602 for all virtual functions 614-617 on the hardware I/O adapter 604. A method may provide more resources to virtual functions with larger bandwidth capabilities that may benefit from more resources, while scaling evenly across all ports 608-611 in order to maximize resource utilization.

The virtual function manager 606 may be similar to the adapter manager 406 of FIG. 4 and the virtual function manager 506 of FIG. 5. The virtual functions 614-617 may be similar to the virtual functions 531-534 of FIG. 5.

Each of the ports 608-611 may include a different number of virtual functions 614-617. For example, the port 608 may include eight virtual functions 614, and the port 609 may include four virtual functions 615. The port 610 may include two virtual functions 616, and the port 611 may include one virtual function 617.

In operation, the virtual function manager 606 may initially assign a single resource of the available resources 602 to each of the virtual function 614-617 of the ports 608-611. Thus, the port 608 may have a total of eight resources 620 (i.e., one resource for each of the eight virtual functions 614) assigned at the initial iteration. The eight resources 620 are dashed to denote an iteration of an illustrative assignment process. The port 609 may have a total of four resources 621 (i.e., one resource for each of the four virtual functions 615) assigned at the initial iteration. The port 610 may have a total of two resources 622 (i.e., one resource for each of the two virtual functions 616) assigned at the initial iteration. The port 611 may have a total of one resource 623 (i.e., one resource for the one virtual function 617) assigned at the initial iteration.

As such, the eight resources 620, the four resources 621, the two resources 622, and the one resource 623 may comprise a first iteration of an assignment process. The resources 620-623 assigned in the first iteration may thus total fifteen resources. Because a total count of fifteen resources is less than the maximum allowable twenty-four resources 602, the system 600 may attempt another iteration of assignments.

A second iteration of assignments may include incrementing the amount of resources assigned to the virtual function 617 of the port 611. As such, the port 608 may continue to have a total of eight assigned resources 624, and the port 609 may have a total of four assigned resources 625. The port 610 may have a total of two assigned resources 626, and the port 611 may now have a total of two resources 627 (i.e., two resources for the one virtual function 617). The 624-627 resources comprising the second iteration of the assignment process may thus total sixteen. Because the total count of sixteen resources is less than the maximum allowable twenty-four resources 602, the system 600 may attempt another iteration of assignments.

A third iteration of assignments may include incrementing the amount of resources assigned to each of the virtual functions 616 of the port 610. As such, the port 608 may continue to have a total of eight assigned resources 628, and the port 609 may have a total of four assigned resources 629. The port 610 may now have a total of four assigned resources 630 (i.e., two resources for each of the two virtual functions 616), and the port 611 may continue to have two resources 631. The 628-631 resources comprising the third iteration of the assignment process may thus total eighteen. Because eighteen resources are less than the maximum allowable twenty-four resources 602, the system 600 may attempt another iteration of assignments.

A fourth iteration of assignments may include incrementing the amount of resources assigned to each of the virtual functions 615 of the port 609. As such, the port 608 may continue to have a total of eight assigned resources 632, and the port 609 may now have a total of eight assigned resources 633 (i.e., two resources for each of the four virtual functions 615). The port 610 may continue to have a total of four assigned resources 634, and the port 611 may have two resources 635. The 632-635 resources comprising the fourth iteration of the assignment process may thus total twenty-two. Because twenty-two resources are less than the maximum allowable twenty-four resources 602, the system 600 may attempt another iteration of assignments.

A fifth iteration of assignments may include incrementing the amount of resources assigned to each of the virtual functions 614 of the port 608. As such, the port 608 may now have a total of sixteen assigned resources 636 (i.e., two resources for each of the eight virtual functions 614), and the port 609 may continue to have a total of eight assigned resources 637. The port 610 may continue to have a total of four assigned resources 638, and the port 611 may have two resources 639. The 636-639 resources comprising the fifth iteration of the assignment process may thus total thirty. Because thirty resources are more than the twenty-four available resources 602, the system 600 may abandon, or reverse, the fifth iteration of assignments.

Because the fifth iteration of assignments was abandoned, a sixth iteration may correspond to the fourth iteration of assignments. That is, the port 608 may be reassigned a total of eight assigned resources 640, and the port 609 may have a total of eight assigned resources 641. The port 610 may have a total of four assigned resources 642, and the port 611 may have two resources 643. The 640-643 resources comprising the sixth iteration of the assignment process may thus total twenty-two.

For a seventh iteration, the system 600 may begin back at the port having the fewest virtual functions (i.e., the single virtual function 617 of the port 611). More particularly, the amount of resources assigned to the virtual function 617 of the port 611 may be doubled (i.e., from two resources per virtual function to four resources per virtual function). As such, the port 608 may continue to have a total of eight assigned resources 644, and the port 609 may have a total of eight assigned resources 645. The port 610 may have a total of four assigned resources 646, and the port 611 may now have four resources 647. The 644-647 resources comprising the seventh iteration of the assignment process may thus total twenty-four. Because twenty-four resources equals the number of the maximum allowable resources 602, the system 600 may allocate the resources 602 according to the assignments of the seventh iteration.

Figure 7:
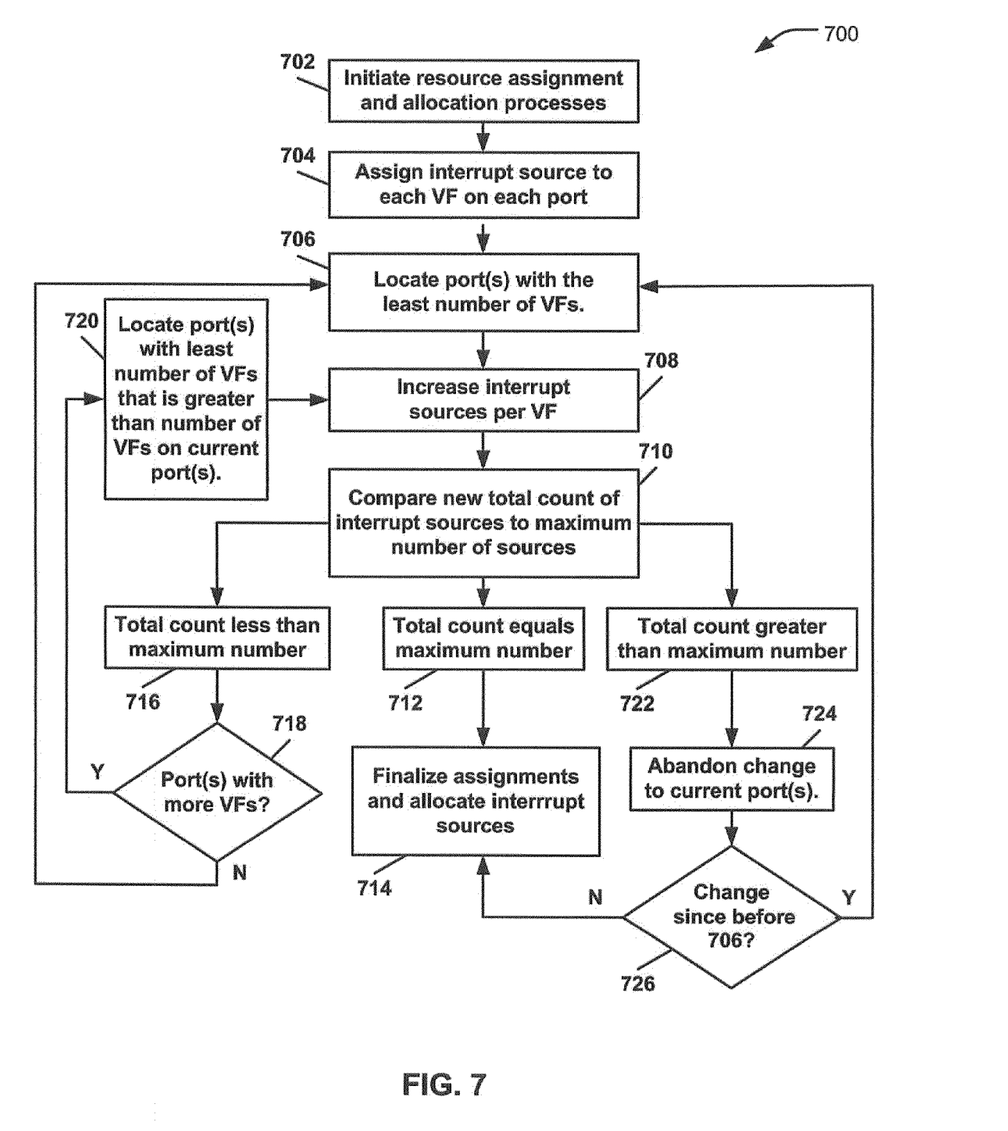
FIG. 7 is a flow diagram of a first method to facilitate assigning resources to virtual functions of an input/output hardware adapter.

The processes embodied in the allocation program code 612 are shown in greater detail in the flowchart 700 of FIG. 7. The flowchart 700 shows an embodiment configured to iteratively assign and allocate resources to virtual functions of an I/O adapter. In one example, the method of FIG. 7 may be performed by the virtual function manager 506 of FIG. 5 or the virtual function manager 606 of FIG. 6.

Turning more particularly to the flowchart 700, resource assignment and allocation processes may initiate at 702. A typical resource may include an interrupt source, however, other computing resources, such as ingress queues, egress queues, and operating modes (e.g., promiscuous mode and diagnostic mode) may also be included.

An interrupt source may be assigned to each virtual function (VF) of each port at 704. For example, the virtual function manager 606 of FIG. 6 may initially assign a resource to each virtual function 614-617 of each port 608-611 of the I/O adapter 604.

One or more ports having the least number of virtual functions may be located at 706. For instance, the virtual function manager 606 of FIG. 6 may determine that the port 611 has the least number of virtual functions, and consequently, the greatest bandwidth.

The number of interrupt sources for each virtual function on the located portion may be increased at 708. For example, the virtual function manager 606 of FIG. 6 may increment the number of virtual functions 617 of the port 611. The amount by which the assigned number of virtual resources per virtual function is increased may vary in different embodiments.

The total count of all resources assigned to all ports may be determined and compared to a maximum allowable number of assigned resources at 710. For instance, the virtual function manager 606 of FIG. 6 may total the number of assigned resources across all the ports 608-611 and compare that total count to the maximum allowable resources 602.

Where the total count equals the maximum allowable number of assigned resources at 712, the system may finalize resource assignments and allocate the interrupt sources at 714. For example, the virtual function manager 606 of FIG. 6 may finally assign and allocate interrupt sources to the virtual functions 614-617 of each port 608-611 of the I/O adapter 604.

Where the total count is alternatively less than the maximum allowable number of assigned resources at 716, the system may determine if there are one or more ports that have more virtual functions than the current port at 718. For instance, the ports 608-610 of FIG. 6 may have more virtual functions 616 than the port 611. They system may then determine at 720 which of the ports 608-610 has the least number of virtual functions. For example, the virtual function manager 606 of FIG. 6 may identify that the port 610 has the least number of virtual functions of the ports 608-610.

The number of virtual functions of the identified port may be increased at 708. For example, the virtual function manager 606 of FIG. 6 may increment each of the virtual functions 616 of the port 610.

Where there are alternatively no ports having fewer virtual functions at 718, the method may return to 706 to located the port having the fewest virtual functions. For instance, the system 600 of FIG. 6 may evaluate the current number of virtual functions 614-617 on each port 608-611 to determine the port having the fewest number of virtual functions.

Where the total count is greater than the maximum allowable number of assigned resources at 722, the system may abandon, or reverse, the previous assignment (e.g., an increase) to the current port at 724. The system may determine at 726 if any assignments have changed since after the initial assignment at 702 (and before the location of the ports having the least number of virtual functions at 706). Where a change has occurred, one or more ports having the least number of virtual functions may be located at 706. Alternatively, the system may finalize resource assignments and allocate the interrupt sources at 714 where no change has occurred. For example, the virtual function manager 606 of FIG. 6 may finally assign and allocate interrupt sources to the virtual functions 614-617 of each port 608-611 of the I/O adapter 604.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments, including embodiments of I/O adapters virtualized in multi-root input/output virtualization (MR-IOV) embodiments, or virtualized using software virtualization intermediaries, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method comprising:
    assigning, at a virtual function manager executing at a processor of a computing device, N resources to each virtual function of a plurality of virtual functions, wherein each virtual function is associated with a port of a plurality of ports of an input/output adapter, and wherein N is an integer greater than 0;
    determining a first port of the plurality of ports based on a first bandwidth availability, wherein the first port is associated with a subset of the plurality of virtual functions;
    assigning a number of additional resources to each virtual function of the subset of virtual functions associated with the first port so that each virtual function of the subset of virtual functions is assigned M resources, wherein M is an integer greater than N, and wherein each resource is assigned to a single virtual function; and
    in response to determining that a total number of resources assigned to the plurality of virtual functions exceeds a threshold, reversing the assignment of the additional resources to the virtual functions of the subset.

2. The method of claim 1, wherein N is equal to 1.

3. The method of claim 1, wherein determining the first port based on the first bandwidth availability further comprises determining that the first port is associated with a first number of virtual functions.

4. The method of claim 3, wherein the first number of virtual functions is less than or equal to a number of virtual functions associated with each other port of the plurality of ports.

5. The method of claim 1, wherein the resources include hardware interrupt sources.

6. The method of claim 1, further comprising determining a number of virtual functions associated with each port of the plurality of ports.

7. The method of claim 1, further comprising determining a total count of resources assigned to the plurality of ports.

8. The method of claim 1, further comprising comparing a first number of virtual functions associated with the first port to a second number of virtual functions associated with a second port.

9. The method of claim 1, further comprising determining whether a resource has been assigned to a virtual function.

10. The method of claim 1, further comprising assigning the number of additional resources to each virtual function associated with a second port of the plurality of ports.

11. The method of claim 10, further comprising:
    determining an updated number of resources assigned to the plurality of virtual functions; and
    in response to the updated number of resources equaling the threshold, for each virtual function of the plurality of virtual functions, allocate to the virtual function each resource assigned to the virtual function.

12. The method of claim 10, further comprising:
    determining an updated number of resources assigned to the plurality of virtual functions; and
    in response to determining that the updated number of resources is greater than the threshold, reversing the assignment of the additional resources to the virtual functions associated with the second port.

13. The method of claim 12, further comprising for each virtual function of the plurality of virtual functions, allocating to the virtual function each resource assigned to the virtual function.

14. The method of claim 1, wherein the number of additional resources is assigned to each of the plurality of virtual functions associated with the first port prior to runtime of the plurality of virtual functions, and wherein the plurality of virtual functions are dynamically allocated to logical partitions.

15. The method of claim 1, wherein the threshold corresponds to a total number of resources available to be assigned.

16. The method of claim 1, wherein the input/output adapter is a virtual input output adapter.

17. An apparatus comprising:
    an input/output adapter including a plurality of ports;
    a memory storing program code; and
    a processor configured to access the memory and to execute the program code to:
        assign N resources to each virtual function of a plurality of virtual functions, wherein each virtual function is associated with a port of the plurality of ports, and wherein N is an integer greater than 0;
        determine a first port, wherein the first port is associated with a first number of virtual functions less than or equal to a number of virtual functions of each other port of the plurality of ports;
        assign a number of additional resources to each virtual function associated with the first port so that each virtual function associated with the first port is assigned M resources, wherein M is an integer greater than N, and wherein each resource is assigned to a single virtual function;

compare a total count of resources assigned to the plurality of ports to a threshold number of resources;

when the total count of resources assigned to the plurality of ports is less than the threshold number of resources, determine a second port of the plurality of ports associated with a second number of virtual functions greater than or equal to the first number of virtual functions and less than or equal to the number of virtual functions of each other port of the plurality of ports;

assign the number of additional resources to each virtual function associated with the second port so that each virtual function associated with the second port is assigned P resources, wherein P is an integer greater than N; and compare an updated total count of resources assigned to the plurality of ports to the threshold number of resources; and when the updated total count of resources assigned to the plurality of ports exceeds the threshold number of resources, reverse the assignment of the number of additional resources to each virtual function associated with the second port.

18. A program product, comprising:

a computer readable storage device storing computer readable program code configured to be executed by a processor to:

assign N resources to each virtual function of a plurality of virtual functions, wherein each virtual function is associated with a port of a plurality of ports of an input/output adapter, and wherein N is an integer greater than 0;

determine a first port of the plurality of ports based on the first port being associated with a virtual function that has a first bandwidth greater than or equal to a bandwidth of each virtual function associated with each other port of the plurality of ports;

assign a second number of additional resources to each virtual function associated with the first port so that each virtual function associated with the first port is assigned M resources, wherein M is an integer greater than N, and wherein each resource is assigned to a single virtual function;

compare a total count of resources assigned to the plurality of ports to a threshold number of resources;

when the total count of resources assigned to the plurality of ports does not exceed the threshold number of resources:

determine a second port of the plurality of ports based on the second port being associated with a second virtual function that has a second bandwidth less than or equal to the first bandwidth and greater than or equal to the bandwidth of each virtual function associated with each port of the plurality of ports other than the first port and the second port;

assign the number of additional resources to each virtual function associated with the second port so that each virtual function associated with the second port is assigned P resources, wherein P is an integer greater than N; and compare an updated total count of resources assigned to the plurality of ports to the threshold number of resources; and when the updated total count of resources assigned to the plurality of ports exceeds the threshold number of resources, reverse the assignment of the number of additional resources to each virtual function associated with the second port.

19. The program product of claim 18, wherein the bandwidth of the virtual functions associated with the first port is determined based on a number of virtual functions associated with the first port.

* * * * *